(12) United States Patent
Waldspurger

(10) Patent No.: US 11,048,418 B2
(45) Date of Patent: *Jun. 29, 2021

(54) RESOURCE ALLOCATION IN COMPUTERS

(71) Applicant: VMware, Inc., Palo Alto, CA (US)

(72) Inventor: Carl A. Waldspurger, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/588,715

(22) Filed: Sep. 30, 2019

(65) Prior Publication Data

US 2020/0104066 A1 Apr. 2, 2020

Related U.S. Application Data

(63) Continuation of application No. 15/918,463, filed on Mar. 12, 2018, now Pat. No. 10,430,094, which is a (Continued)

(51) Int. Cl.
| | |
|---|---|
| *G06F 3/06* | (2006.01) |
| *G06F 9/48* | (2006.01) |
| *G06F 9/50* | (2006.01) |
| *H04L 12/26* | (2006.01) |
| *H04L 12/917* | (2013.01) |
| *H04L 12/24* | (2006.01) |

(52) U.S. Cl.
CPC .......... *G06F 3/0631* (2013.01); *G06F 3/0604* (2013.01); *G06F 3/0653* (2013.01); *G06F 3/0683* (2013.01); *G06F 9/4881* (2013.01); *G06F 9/5016* (2013.01); *H04L 41/5054* (2013.01); *H04L 43/04* (2013.01); *H04L 43/08* (2013.01); *H04L 47/76* (2013.01)

(58) Field of Classification Search
CPC combination set(s) only.
See application file for complete search history.

(56) References Cited

U.S. PATENT DOCUMENTS

| | | |
|---|---|---|
| 5,850,385 A | 12/1998 | Esaki |
| 6,081,710 A | 6/2000 | Sherman et al. |
| (Continued) | | |

OTHER PUBLICATIONS

Waldspurger, Carl A., "Lottery and Stride Scheduling: Flexible Proportional-Share Resource Management," Ph.D. Dissertation, Massachusetts Institute of Technology; Dept. of Electrical Engineering and Computer Service; Sep. 1995.
(Continued)

*Primary Examiner* — El Hadji M Sall

(57) ABSTRACT

A method and tangible medium embodying code for allocating resource units of an allocatable resource among a plurality of clients in a computer is described. In the method, resource units are initially distributed among the clients by assigning to each of the clients a nominal share of the allocatable resource. For each client, a current allocation of resource units is determined. A metric is evaluated for each client, the metric being a function both of the nominal share and a usage-based factor, the usage-based factor being a function of a measure of resource units that the client is actively using and a measure of resource units that the client is not actively using. A resource unit can be reclaimed from a client when the metric for that client meets a predetermined criterion.

20 Claims, 2 Drawing Sheets

Related U.S. Application Data continuation of application No. 15/142,031, filed on Apr. 29, 2016, now Pat. No. 9,916,106, which is a continuation of application No. 14/295,191, filed on Jun. 3, 2014, now Pat. No. 9,363,197, which is a continuation of application No. 13/460,746, filed on Apr. 30, 2012, now Pat. No. 8,745,241, which is a continuation of application No. 12/027,853, filed on Feb. 7, 2008, now Pat. No. 8,171,140, which is a continuation of application No. 09/952,796, filed on Sep. 12, 2001, now Pat. No. 7,412,492.

(56) References Cited

U.S. PATENT DOCUMENTS

| | | |
|---|---|---|
| 6,260,068 B1 | 7/2001 | Zaleski et al. |
| 6,275,830 B1 | 8/2001 | Muthukkaruppan et al. |
| 6,438,537 B1 | 8/2002 | Netz et al. |
| 6,466,559 B1 | 10/2002 | Johansson et al. |
| 6,477,612 B1 | 11/2002 | Wang |
| 6,675,278 B1 | 1/2004 | Chowdhary et al. |
| 6,697,863 B1 | 2/2004 | Egawa et al. |
| 6,725,457 B1 | 4/2004 | Priem et al. |
| 6,728,895 B1 * | 4/2004 | Nelson ............... G06F 11/3006 348/E7.071 |
| 6,745,262 B1 | 6/2004 | Benhase et al. |
| 6,754,714 B1 | 6/2004 | Chebrolu |
| 6,772,162 B2 | 8/2004 | Waldo et al. |
| 6,832,248 B1 | 12/2004 | Byrnes |
| 6,865,393 B1 | 3/2005 | Baum et al. |
| 6,889,259 B2 | 5/2005 | Kapoor |
| 7,225,223 B1 | 5/2007 | McCarthy et al. |
| 2002/0031119 A1 | 3/2002 | Brouel et al. |
| 2002/0120565 A1 * | 8/2002 | Yu ....................... G06Q 20/102 705/40 |

OTHER PUBLICATIONS

Waldspurger, Carl A. and Weihl, William E., "An Object-Oriented Framework for Modular Resource Management", Proceedings of the Fifth Workshop on Object-Orientation in Operating Systems (IWOOS '96); Seattle, WA; Oct. 1996.

Sullivan, David G. and Seltzer, Margo, "Isolation with Flexibility: A Resource Management Framework for Central Servers"; Computer Science Technical Report TR-13-99, Harvard University; Dec. 1999.

* cited by examiner

RESOURCE ALLOCATION IN COMPUTERS

CROSS-REFERENCE TO RELATED APPLICATIONS

This application is a Continuation of U.S. patent application Ser. No. 15/918,463, filed Mar. 12, 2018, which is a Continuation of U.S. patent application Ser. No. 15/142,031, filed Apr. 29, 2016, issued as U.S. Pat. No. 9,916,106, which is a Continuation of U.S. patent application Ser. No. 14/295,191, filed Jun. 3, 2014, issued as U.S. Pat. No. 9,363,197, which is a Continuation of U.S. patent application Ser. No. 13/460,746, filed Apr. 30, 2012, issued as U.S. Pat. No. 8,745,241, which is a Continuation of U.S. patent application Ser. No. 12/027,853, filed Feb. 7, 2008, issued as U.S. Pat. No. 8,171,140, which is a Continuation of U.S. patent application Ser. No. 09/952,796, filed Sep. 12, 2001, issued as U.S. Pat. No. 7,412,492. The prior applications are specifically incorporated herein by reference.

BACKGROUND OF THE INVENTION

Field of the Invention

This invention relates to the field of resource allocation mechanisms within computers, especially where the resource is system memory, which must be allocated among different subsystems or applications that may need to compete for use of the resource.

Description of the Related Art

The world is full of examples of competition for limited resources. As but one example, arable land is one such limited resource, and there are many different ways to allocate it. According to perhaps the simplest allocation scheme, might makes right, and the person or group with the most force gets the most, or the best, land. One of the main reasons for the existence of governments is to lessen the tendency to violent confrontation that the might-makes-right model usually leads to.

One way to allocate a limited resource such as land is to implement a first-to-arrive wins scheme. Pioneers have often applied this system, as have Oklahomans. Another way is to allocate land using a lottery. The drawback of these schemes is that they reward the quick (or cheaters) or lucky, respectively, but do nothing to ensure that the most productive will get all the land they can use, or that the needy but hard-working will get enough land for their survival.

In one system of government, the ruler or ruling class (such as the "Party") claims all land as his/its own, and allocates use of it to subjects according to some scheme. One allocation scheme is simply that each subject gets the same amount of land. In another static scheme, some subjects are "more equal" than others, and are allocated more land because they are for some reason favored by the ruler(s) (usually because they are the rulers, or their relatives or friends or benefactors).

Besides the tendency towards oppression and corruption, the greatest objection to these static, relatively inflexible, centrally planned allocation systems is that they are inefficient—not everyone needs or can use or even wants the amount of land he is allocated, and others who are more productive and ambitious do not get what they want or need. Greater accuracy can usually be achieved by introducing a feedback mechanism. In most situations involving the distribution of a shared resource, the feedback mechanism is typically some form of price, which is determined by the supply of and demand for the resource. Those who want more of the resource must pay for it, and when supply falls short of demand, the price rises until only those who can afford the resource remain in the bidding.

In the classical laissez-faire system, the government does not impose its goals on the market actors but rather simply enforces the decisions made by the market actors themselves. Of course (and many would say, "unfortunately"), those who control governments very often do have their own agendas. They may impose these agendas either directly or indirectly. Direct imposition usually involves edicts backed up by threats of confiscation, imprisonment, or bullets. Indirect imposition usually involves a tax: The actions of those interested in using the shared resource are influenced by penalizing those who do not use it in the way the government wants by being forced to pay a tax. In effect, a tax is used to alter the cost of and thus demand for the resource in a manner unrelated to supply.

Designers of computer systems face problems of resource allocation that are analogous to those that arise in the field of Economics, with the operating system usually playing the role of the government and various applications acting as the subjects. The analogy is not perfect, however: As has been well known since before Egyptian scribes counted individual sheaves of wheat for purposes of taxation, whenever a ruling system made up of humans controls and decides to allocate a resource, it often chooses to enrich itself and increase its own power at the expense of those who would use the resource productively. Even when the ruling elites believe in egalitarianism (for all but themselves), and set out to take a resource from A in order to give it to B, they usually drain off a large part of the transferred resource for their own benefit and for the cost of "administration," In clear contrast, an operating system in a computer preferably creates as little overhead and waste as possible and tries to reduce delay and maximize the efficient use of the resource by the clients (applications, users, etc.) themselves.

One resource that frequently must be allocated among different competing applications or users is system memory, which is usually (but not necessarily) volatile, but which is much faster than non-volatile storage devices such as disks. For example, a common task of a server is to decide how to allocate the server's system memory to the many clients that are connected to the server at any given time. There are, accordingly, several different known methods for allocating this resource, most of which can be analogized to the economic methods described above. These methods include, for example, first-come first-served, where memory is allocated to the first clients that request it: static partitioning, where a fixed amount of memory is reserved for each client: and algorithms based on reducing the aggregate amount of swapping, which typically lack any way to express the relative importance of individual clients.

Memory is the most prevalent shared space-limited resource, but similar problems arise with respect to the allocation of other resources that are restricted as to time instead of, or in addition to, space. For example, CPU time is a resource, a is access to more than one CPU in a multi-processor architecture.

One known method for allocating a resource among competing clients (such as processes) involves the concept of "shares," which are also referred to in the literature as "weights" or "tickets" and which represent a measure of each client's entitlement to the resource relative to other clients. In a "proportional-share" allocation scheme, a first client with twice as many shares as a second client will thus generally be entitled to be allocated twice as much of the resource as the second client. Share encapsulate the right to use resources, and the distribution of shares provides explicit control over the relative importance of different clients. Share-based allocation is therefore desirable across a broad spectrum of systems that service clients of varying importance.

Several known methods for proportional-share scheduling of various resources, including both randomized and deterministic algorithms for allocating processor time, memory space, access to locks, and I/O bandwidth, etc., are described in "Lottery and Stride Scheduling: Flexible Proportional-Share Resource Management." Carl A. Waldspurger, Ph.D. Dissertation, Massachusetts Institute of Technology, Dept. of Electrical Engineering and Computer Science, September 1995, which also appears as Technical Report MIT/LCS/TR-667. Various aspects of these methods and extensions to them are also described in "An Object-Oriented Framework for Modular Resource Management," Carl A. Waldspurger and William E. Weihl, Proceedings of the Fifth Workshop on Object-Orientation in Operating Systems (IWOOOS '96), Seattle, Wash. October 1996. According to the methods described in these references, resource rights are encapsulated by abstract, first-class objects called tickets, and active clients consume resources at a rate proportional to the number of tickets that they hold. Tickets can be issued in different amounts and may be transferred between clients. A modular currency abstraction is also introduced to flexibly name, share, and protect sets of tickets. Currencies can be used to isolate or group sets of clients, enabling the modular composition of arbitrary resource management policies. Furthermore, this reference introduces and describes a resource revocation mechanism termed "min-funding revocation," according to which memory is allocated by revoking it from clients that "pay" fewer shares per unit memory, and grants it to clients that pay more per unit memory.

Extensions to the lottery-scheduling resource management framework that increase its flexibility while providing improved support for simultaneously managing multiple resources (including CPU time, physical memory, and disk bandwidth) are described in "Isolation with Flexibility: A Resource Management Framework for Central Servers," David G. Sullivan and Margo Seltzer, Computer Science Technical Report TR-13-99, Harvard University, December 1999, which also appeared in USENIX 2000 Technical Conference, San Diego, Calif., June 2000. This paper also identifies a well-known limitation of existing proportional-share memory management techniques: As Sullivan and Seltzer point out, "[e]ffective proportional-share memory management is complicated by the difficulty of determining which processes are actively competing for memory and by the undesirability of a strict partitioning of memory among processes." Because of these difficulties, the limited solution they then propose gives memory guarantees only to privileged processes that explicitly request them.

There are two separate issues involved in a resource allocation decision in a proportional-share system: first, how much of the resource each client "needs", and, second, how much of the resource the client is entitled to based on its share allocation. Note that it is completely reasonable to give more resources to a client that has more shares than to another that "needs" them more, as long as both are actively using the allocations that they have been given. The main weakness of the conventional proportional-share methods is felt in the case where a client is unproductively hoarding the resource it has been allocated. For example, the hoarding client may have allocated to it memory pages that it does not reference for a long time and thus are idle—these pages could be more productively reallocated to another client. Indeed, in practice, much of the allocated resource may actually remain idle.

In order to eliminate this weakness, the system must be able to determine how much of the resource is being wasted through idleness or inactivity. This task has often been viewed as too difficult or complicated even to attempt, or more of a task than is justified by the potential reduction in idleness. Despite the different advances that have been made in the area of allocation schemes for computer resources, there is thus still the need for an allocation method that increases efficiency in the sense of optimum usage of the limited resource by clients of varying importance. In particular, within a proportional share framework, what is needed is a way not only to respect the share allocations of the different clients, but also to identify when allocated resource units are idle and to be able to reallocate these units to other clients who will use them more productively. This invention provides such an improved method, as well as a system that implements it.

SUMMARY OF THE INVENTION

The invention provides a method, as well as a system implementation, for allocating the units of a resource among a plurality of clients in a computer where the resource can be allocated in predetermined resource units. For each client, a metric is evaluated that is a function both of a non-usage-based, client-specific factor and of a usage-based factor. The usage-based factor is in turn a function of, as separate variables, a first and a second measure of resource units currently allocated to the respective client that that client is actively using and that are idle, respectively. At least one resource unit is then reclaimed for reallocation from the client whose metric meets a predetermined criterion.

Resource reclamation and reallocation is preferably carried out when a reallocation signal is sensed. In some embodiments, the reallocation signal is a request for at least one additional resource unit issued by one of the clients. Instead, or in addition, the reallocation signal may be non-client-initiated, such as a system-generated, periodic signal.

The preferred embodiment of the invention relates to proportional share allocation, in which each client is assigned a share, with each share forming the non-usage-based, client-specific factor for the respective client and having a value corresponding to a nominal entitlement to the resource units relative to the values of shares of the other clients.

For each client, the metric is calculated as a function of a cost function, which forms the usage-based factor and is preferably a linear combination of the first and second measures. The second measure in the cost function is preferably weighted by a cost factor such that the second measure is weighted more heavily in the cost function than the first measure.

According to the invention, the cost factor may be determined in several different ways. For example, the cost factor for each client may be set as a constant and equal for all clients. It may also be set according to a function that increases as the sham value of the respective client increases, or as the share value decreases, and/or according to a function of the first and second measures of the respective client, and/or of time. Other alternatives may also be implemented.

In some circumstances, some resource units may be allocatable, but as yet unallocated. In other words, there may be a free pool of resource units from which to draw before having to reclaim units from a client. One way to handle allocation of free-pool resource units according to the invention is to include a free-pool client as one of the clients. Free resource units are then allocated to the free-pool client. As long as at least one free resource unit remains allocated to the free-pool client, the metric of the free-pool client is fixed to a value that meets the predetermined criterion. On the other hand, when no resource units remain allocated to the free-pool client, the metric of the free-pool client is fixed to a value that does not meet the predetermined criterion. In short, as long as the free-pool client has resource units available for allocation, then these are allocated as needed to other clients; otherwise, units are reclaimed from clients other than the free-pool client.

The invention is able to efficiently allocate many different kinds of resources, including those that are time-shared and those that are space-shared, or even both. The resource in the preferred embodiment of the invention is system memory, in which case the resource units will typically be memory pages. Other resources include, but are not limited to: processing time of at least one processor; a plurality of processors, each processor forming one of the resource units; I/O device or network bandwidth; and even electrical energy.

In a networked embodiment of the invention, the clients are remote systems that communicate with a server via a network and evaluation of the metrics, reclamation of resource units, (re)allocation of the reclaimed resource units are carried out within the server.

In a virtualized embodiment of the invention, the allocatable resource is system memory and the resource units are machine memory pages that are identified by corresponding machine page numbers (MPNs). In this embodiment, the clients are virtual machines (VMs) that issue requests for physical pages, which are identified by corresponding physical page numbers (PPNs), via a virtual machine monitor (VMM). System memory is allocated to the respective virtual machines as PPNs and the PPNs are mapped to MPNs within the VMM. The first and second measures of resource units are then determined by evaluating usage by each respective client of physical pages.

The invention also includes a mechanism for measuring how much of the resource units allocated to each client are being used actively by that client. In the preferred embodiment of the invention, this mechanism is statistical sampling. Accordingly, a subset of the resource units currently allocated to the respective client is selected and use by the client of the units in the selected subset of resource units is traced. Over a time interval, the number of resource units in the subset that are used by the client and the number of resource units that remain unused by the client are then determined. The first and second measures may then be set such that the ratio between the first and second measures is substantially equal to the ratio between the number of resource units in the subset that are used by the client and the number of resource units that remain unused by the client.

The sampling procedure may be used to estimate active use even of resources such as the bandwidth of an I/O device, which has a queue of pending I/O requests. In this case, the system according to the invention can trace use by the client by measuring a percentage or frequency of emptiness of the queue during a time when access to the I/O device is allocated to each respective client.

The invention also encompasses a computer-readable medium that carries instructions executable by a computer for performing the steps of resource allocation summarized above.

DETAILED DESCRIPTION

The invention provides a mechanism for allocation of a resource among different clients that may want to use it and whose requests for use of the resource may conflict. This broad statement includes at least three concepts whose specifics define different embodiments or aspects of the invention, namely, "resource," "client" and "allocation." These concepts will be made clearer below.

General System Configuration

Figure 1:
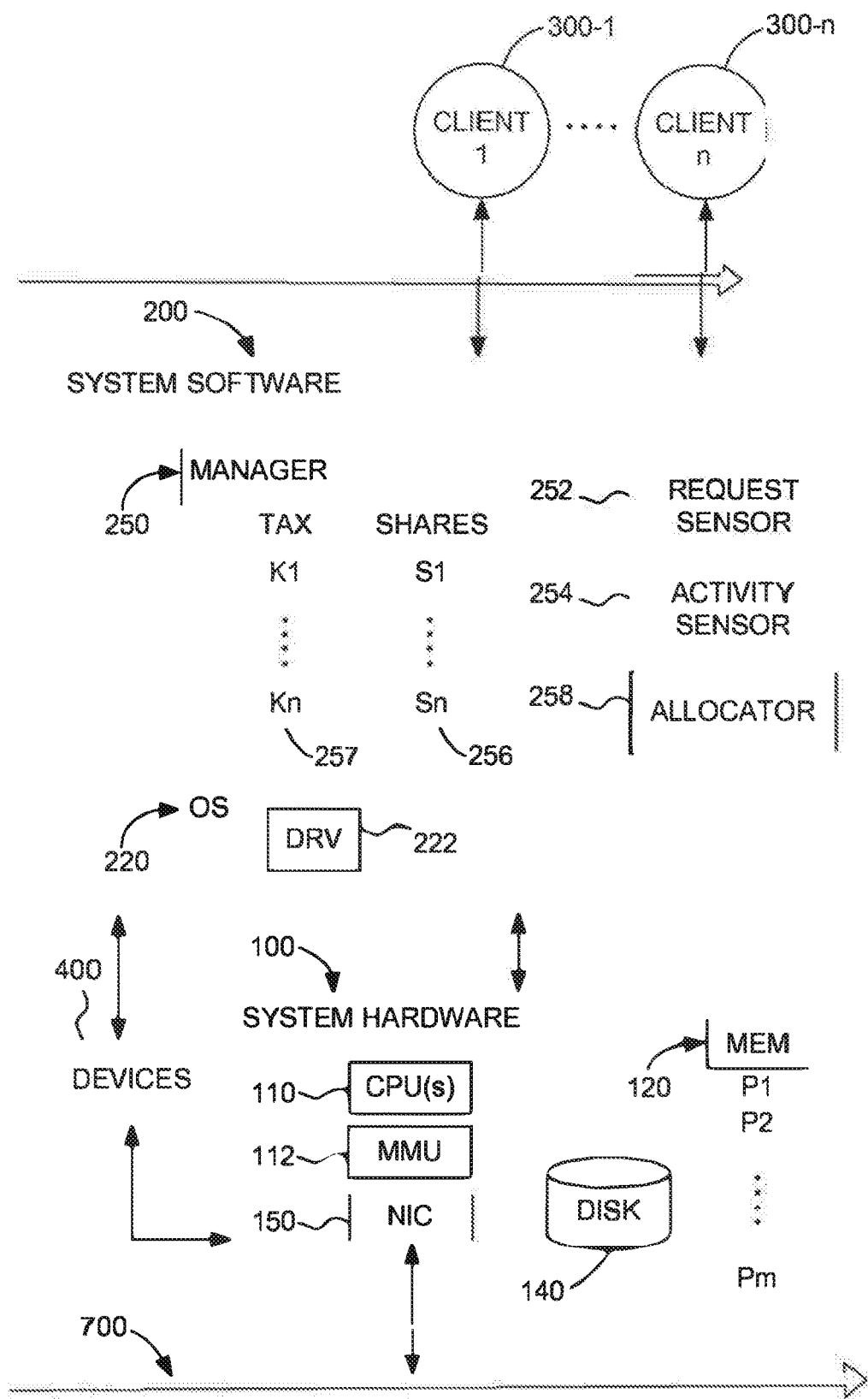
FIG. 1 is a block diagram that shows the main hardware and software components of a system according to the invention for allocating a resource among a plurality of clients.

As FIG. 1 shows, the main components of the system according to the invention include an underlying system hardware platform 100, system software 200, and a plurality of clients 300-1 . . . 300-$n$ that run on the system software 200. As in most computers, two different types of data storage are commonly provided: a system memory 120, typically implemented using any of the various RAM technologies, and a usually higher capacity storage device 140 such as one or more memory disks, FIG. 1 also shows that conventional peripheral devices 400 may be connected to run on the hardware 100 via the system software 200; no particular peripheral devices are required by the invention.

The system hardware 100 includes one or more central processors CPU(s) 110, which may be a single processor, or two or more cooperating processors in a known multiprocessor arrangement. As in other known systems, the hardware includes, or is connected to, conventional registers, interrupt-handling circuitry, etc. The hardware typically also includes a memory management unit MMU 112 which the invention uses when the resource to be allocated is memory. This invention does not presuppose any particular hardware platform.

As in other computer systems, the system software 200 according to the invention either is or at least includes an operating system OS 220, which will include drivers 222 as needed for controlling and communicating with the various devices 400 and, usually, for the disk 140 as well. Because this invention does not presuppose any particular operating system, and because the characteristics and functions of operating systems are so well known, the OS 220 is not discussed in greater detail, except insofar as it includes or cooperates with the components of the system unique to the invention.

One of these unique components is a software module referred to as a resource manager 250, which is described separately below. In one embodiment of the invention, the manager 250 is implemented using known techniques, as a part of the memory-management routines found within the OS 220 itself. In a preferred, virtualized embodiment of the invention, however, the module 250 is implemented within a separate software mechanism used to control virtual machines (VMs). In this virtualized embodiment, the invention may be implemented without requiring any changes to the OS 220 itself. These embodiments and aspects of the invention are described in more detail below.

Clients

The nature of the clients 300-1 . . . 300-$n$ will vary depending on the chosen use of the invention. In the simplest case, the clients may be conventional applications or "processes" that are installed to run on the OS 200. The invention may also be used in a network server environment, in which the clients are remote systems that communicate with the OS 220 (which will then be part of a server) via a network 700, in which case the hardware will also include a standard interface circuit such as a network interface card NIC 150. In the preferred, virtualized embodiment of the invention, the clients are virtual machines; this embodiment is discussed separately below.

Resources

The invention may be used to allocate many different types of resources. These may be classified broadly according to how they are shared, in particular, as to whether they are space-shared or time-shared or both. A resource consisting of multiple units, such as memory pages (or multiple CPUs in a multiprocessor), can be space-shared by dividing the units across multiple clients. On the other hand, a resource that is a single indivisible unit, such as a CPU or an I/O device, must be time-multiplexed in order to share it among multiple clients. Note that some resources (or sets of resources) may be both time-shared and space-shared; for example, space-shared resources are in some cases also reallocated over time.

The most common space-shared resource is the memory 120, which may be of any type and at any level of the system. In the context of this invention, the term "space" will therefore not usually refer to a volume or area, but, as is common in computer science, is used rather as a term to conceptualize a limited number of some available resource unit. For example, as is well known, in most modern computer architectures, system memory is typically divided into individually addressable units commonly known as "pages." each of which in turn contains many separately addressable data words, which in turn will usually comprise several bytes. In Intel x86 systems, for example, each page comprises 4096 bytes. Pages are identified by addresses commonly referred to as "page numbers." In FIG. 1, memory pages are thus indicated as P1, P2 . . . Pm. The invention does not presuppose any particular page size: Any memory unit may be used and will require little or no modification of the preferred embodiment of the invention described below.

"Space" therefore generally implies some numerical limitation. System memory is the resource assumed in the primary example of the invention described below; other examples include high-speed cache memory. I/O buffer space or buffer cache pages within an operating system, or memory regions allocated for different clients within an application or run-time system. Yet another example of a space-shared resource are CPUs in a multi-processor architecture, in which the clients may be competing to gain access to more of the CPUs. Examples of resources that are time-shared include various types of I/O bandwidth, including wired and wireless network bandwidth and bandwidth to disks or other peripheral devices, and CPU processing time. In short, the invention may be used to allocate any space- or time-shared resource whose allocation among the different clients can be handled by a mechanism such as the manager 250. As such, other examples of shared resources will be obvious to skilled computer scientists.

Note that electrical energy is, in many systems (for example, battery-powered portable computers), also a resource that must be allocated among different clients. Because energy can also be measured and allocated in predetermined units such as Joules or seconds of connection to the power source or, in particular for batteries, ampere-seconds (-minutes, -hours, etc.), the invention may also be used to manage a power resource. In such case, the allocation mechanism will include or control the necessary hardware components.

In the following discussion, it is assumed by way of illustration that the resource to be allocated is memory. Skilled programmers will understand how to adapt the invention to implementations in which use of other resources is to be controlled.

Resource Manager

The manager 250 includes various software modules that are used to implement the invention. These modules include a request sensor 252, an activity or use sensor 254, a table 256 of current shares, a table 257 of current "tax" parameters, and a resource allocation module 258. Those skilled in the art of computer programming, especially of system software, will be able to implement these modules using known programming techniques given the description of the invention below. Of course, the tables 256, 257 will themselves be stored in memory. The functions of the various modules perform will become clear from the discussion below.

The manager 250, including the modules 252, 254, 258, may be loaded in any conventional manner into, or along with, the existing system software 200. For example, the manager and modules may be recorded on a computer-readable medium such as a CD-ROM disk and installed manually, or they may be downloaded via a network.

Proportional Resource Allocation

Unlike the proportional-share allocation schemes found in the prior art, the invention provides a flexible method for taking dynamic resource usage information into account when allocating the scarce resource among multiple clients. In the simplest embodiment, resource consumption is assigned a cost, which is greater if the client currently assigned the resource lets it remain idle, that is, unused. The cost decreases if the client actively uses (in the case of memory, reads from or writes to) the resource it has been allocated.

Again, for the sake of simplicity, assume that the resource to be allocated is memory. A convenient way to view the method according to the invention is by imagining that a "tax" is imposed on idle memory. By making the tax parameter(s) Ki configurable, for example, by a system administrator, the manager 250 can decide how much to penalize a client for not using all of the memory it has been allocated: A tax rate (which is derived from Ki) of 0% on idle memory means that idleness is not taken into account at all, so for allocation purposes it does not matter whether a client is actively using the memory it has been allocated. A tax rate of 100% means that all idle memory may be reclaimed from a client, that is, the client should "use it or lose it." Intermediate tax rates can be used to flexibly specify the extent to which the manager considers idle memory in allocation decisions.

Assume that there am 1200 units (such as memory pages) of the resource (such as memory) to be allocated between two clients C1 and C2. Of course, in actual implementations there will typically be many more clients and the number of resource units will depend on their type; thus, where the resource units are memory pages, there may be many more than 1200 units, but where the units are CPUs, there will probably (but not necessarily) be far fewer. Except in degenerate cases (such as zero or only a single client and/or allocatable resource unit) the principles described hem apply to any number of clients and resource units.

According to the invention, the amount of memory allocated to each client is directly proportional to its "share" (also known as "weight" or "ticket") parameter Si. In other words, each client is generally entitled to a fraction of memory (or of any other resource) equal to its fraction of the total number of shares of all the clients currently in the system. Thus, the fraction of total resource units that client Cj will be nominally be entitled to is equal to $$\frac{Sj}{\sum_k S_k},$$

where the sum is taken over all the k clients that are currently in the system. This entitlement is "nominal" because, according to the invention, actual share-based allocation of the available resource units for each client is adjusted as a function of the client's use of its current allocation: If a client is actively using 100% of its nominal allocation, then the manager will allow the client to keep its share-based entitlement; otherwise, in case of conflict, the manager may revoke any or all of the client's allocated but idle resource units.

Note that this definition is dynamic: As clients enter and leave the system, the share-based entitlement of each client may change even though its number of shares does not. Furthermore, the concept of shares is essentially independent of the actual number of resource units available for allocation among the various clients.

Examples of when clients might enter or leave the system include: creation and termination of processes in an operating system; powering on or off of a VM in the virtualized embodiment of the invention; and logging onto and off of a server where the clients are remote computers that access a server resource (such as memory). Clients will also frequently enter and leave the system even in non-networked configurations. For example, if the resource is a time-shared I/O device, then each client that needs it would enter the allocation system and would leave it when its I/O task is completed.

The number of shares assigned to each client may be determined in any of several different ways. One way is to impose a predetermined or externally controlled share distribution scheme on the clients; Some system administrator simply assigns shares in order to implement a given policy. One such policy would be "egalitarian," with all clients receiving the same number of shares. Another policy would be to follow a hierarchy of priority, according to which clients who perform more important or more time-critical tasks are given more shares. Still another policy would be to estimate each client's need for the resource and to allocate shares accordingly; for example, large applications, or those that are memory intensive, such as voice-recognition or real-time video, could be assigned shares in proportion to their estimated need. Many other policies are also possible: the invention accommodates all such share allocation schemes.

Share allocation may also be "market driven." Assume, for example, that the clients are remote systems and that the invention is included in a server. The clients could then "buy" (even literally) more shares, with the amount of actual resource units each share corresponds to reflecting current availability.

Where the resource unit is a time unit of network access (bandwidth), a client might, for example, pay more to be guaranteed a higher likelihood of receiving more of the available bandwidth. This client would therefore buy more shares. Any such share distribution scheme, both those set by an administrator and those that are "market driven," may be used in the invention. Note that one of the advantages of the invention is that, regardless of the share distribution scheme used, the amount of actual resource units allocated to a given client will be adjusted dynamically to reflect its current, actual need, which is determined as a function of how much of its currently allocated memory it is actually using.

Continuing with the example above, assume that client C1 has twice as many shares as C2, for example, S1=200 and S2=100. Client C1 will thus be entitled to an allocation that is twice as large as the allocation for C2. In other words, if only C1 and C2 are active with a 200:100 share ratio, then C1 is entitled to ⅔ of all memory, and C2 is entitled to ⅓ of all memory. If there are other clients also currently in the system, then the entitlement ratio 200:100 will remain the same, but the actual allocation of units may differ. For example, if them are 1200 total pages that are available for allocation to clients, and C1 and C2 are currently the only clients, then C1 will be entitled to 800 pages and C2 will be entitled to 400 pages. If, however, a third client C3, which has 500 shares, enters the system, then the respective entitlements of C1, C2 and C3 will be in the proportion 200:100:500, or (assuming 1200 total pages) 300, 150 and 750 pages.

Note that "entitlement" according to the invention is not the same as actual current allocation. As will become clearer below, if, for example, client C1 is not using all of the 300 pages to which it is nominally entitled, then the manager 250 may reclaim some of the 300 pages for allocation to another client. If, however, all clients are actively using all of the pages to which they are entitled, then the manager will allocate pages according to the proportion of total shares owned by each client.

The total number of shares represented in the system at any given time is preferably limited to some predetermined maximum in order to ensure that each share corresponds to some guaranteed minimum amount of the resource. Consequently, if a client wishing to enter the system has a number of shares that would cause the total to exceed the maximum, then either the client could be denied entry and requested to retry entry later (as in conventional "admission control"), or its share allocation could be reduced temporarily to keep within the maximum until some other existing client(s) leave the system.

Different policies may be used to decide how many resource units there, pages) a client receives when it first enters the system. If the number of clients is known in advance, and all are started at roughly the same time, then one policy would be for the manager 250 to initially allocate to each client the fraction of total pages equal to its fraction of total shares. This will usually not be the case, however. A preferred policy is therefore that a client's initial allocation is zero, with all allocations being adjusted on demand. As will become clearer from the examples below, as long as the client continues to request pages, either singly or in blocks, and uses actively those that are allocated to it, then its actual allocation will ultimately converge to its full entitlement.

According to the invention, if there is a "free" pool of unallocated memory from which to draw, then the manager 250 allocates additional pages as requested from this pool to the requesting client. When there is a contention for memory (for example, memory is over-committed), however, all available memory will already have been allocated to the clients in the system and there will consequently be no "free pool" of memory from which to draw. Any request for additional pages by a client will therefore create a conflict. The request for allocation of pages may be sensed by the module 252 in any known manner. The manager 250 must then determine from which other client to take the requested page(s), or it must deny the request, or it may fulfill the request by forting the requesting client itself to swap other pages to disk in order to gain more allocatable pages of memory.

Note that whenever a page is revoked from any client (not just from the requesting client itself), the reclaimed page is typically swapped to disk. This feature is not required by any embodiment of the invention, but is preferably included in the embodiments of the invention in which the resource to be allocated is memory in order to preserve the data before reallocating the page to another client.

According to the invention, the manager determines from which client to reclaim pages based on a metric Mi that is a function of, on the one hand, the number of shares "owned" by each client and, on the other hand, a cost function. The metric Mi thus combines information concerning both a non-usage-based, client-specific factor (shares) and a factor (the cost function) based on current usage, and thus represents adjusted shares per resource unit. Table 1 introduces notation discussed in the examples below.

TABLE 1

| | |
|---|---|
| Si | Number of shares currently controlled by Client i, that is, by Ci |
| Ui | Number of resource units currently being actively used by Ci |
| Ni | Number of resource units assigned to Ci that are currently idle, that is, not being used actively |
| Ti | Total number of resource units assigned to client Ci; thus, Ti = Ui + Ni |

In the preferred embodiment of the invention, the measure of ownership (or entitlement to allocation) is shares $S_i$ and the cost function is a linear combination $X_i$ of the number $U_i$ of units currently in use by each client and the number $N_i$ of units that the client has been allocated but that are not currently being used actively. In this preferred embodiment of the invention, the metric $M_i$ is the ratio between $S_i$ and $X_i$:

$$M_i = S_i/X_i$$

The preferred cost function $X_i$ is:

$$X_i = C^*U_i + K_i^*N_i$$

where C and K are cost parameters. In particular, $K_i$ is a "tax parameter" or "cost factor" that specifies a "tax rate" that the manager 250, in particular, the allocation module 258, applies to allocated but currently idle resource units. In general, the tax rate (in percentage) will be $100^*(1-1/K_i)$, where $K_i$ is greater than or equal to unity. The nature and effect of $K_i$ are explained in greater detail below.

The variables $U_i$ and $N_i$ thus form measures of how many resource units client Ci is actively using, and leaving idle, respectively, and C and $K_i$ are weights assigned to each of these measures. As is pointed out below, $U_i$ and $N_i$ may be actual counts of the respective resource units; however, in the preferred embodiment of the invention, they are estimated using statistical sampling.

Because the cost function $X_i$ and the subsequent formulas (see below) relate the cost of idle units relative to actively used units, C may be set equal to unity with no loss of generality. (If C is any other value, then it will simply have the effect of scaling the tax parameter $K_i$ equally for all clients, and will not affect the ultimate allocation decision. If one were to set $C \neq 1$, then $K_i$ could simply be changed to $C^*K_i$ in order to achieve the same effect that would have occurred had C=1 and $K_i$ were left as is.) Thus, the allocation formula may be simplified to:

$$X_i = U_i + K_i^*N_i$$

Of course, the two formulas for $X_i$ and $M_i$, and the calculations they represent, may be combined into a single formula, $M_i = S_i/(U_i + K_i^*N_i)$, and are evaluated in the allocation module 258. According to the invention, when the manager 250 senses a request for an additional page that gives rise to a conflict, it preferably takes the page from whichever client (including the requesting client) that currently has the minimum value of the metric $M_i$. Note, by way of comparison, that in the prior art min-funding revocation approach mentioned above, pages were taken from the client with the minimum value of $S_i/T_i = S_i/(U_i + N_i)$, that is, with no variable tax parameter $K_i$ applied to the number of unused pages.

It is not necessary for the cost function $X_i$ to be the preferred linear combination of $U_i$ and $N_i$. Even a more complicated, non-linear cost function could be implemented. The preferred linear combination has the advantage, however, of computational simplicity and therefore speed.

By way of example, assume that there are 1200 total memory pages, and that them are four clients C1, C2, C3 and C4, with shares distributed as S1=100 and S2=200, S3=250, and S4=50. If C1, C2, C3, and C4 actively use their entire allocations, they will converge to their nominal entitlements of 200, 400, 500, and 100 pages, respectively.

For purposes of this example, assume that a) C1, C2, C3, and C4 are currently actively using 150, 17.5, 0.350 and 100 pages, respectively (C4 is using 100 of its allotment, whereas the other clients are not); b) there is a "flat tax" (see below for alternatives) such that K1=K2=K3=K4=4; and c) C4 issues a request for at least one more page, which is detected by the sensor 252. The manager 250 must then decide whether to take the additional page from C1, C2, or C3, or, indeed, from C4 itself (thereby forcing a swap to disk by C4). The current allocation and usage values for the four clients would then be as shown in Table 2.

TABLE 2

| | C1 | C2 | C3 | C4 |
|---|---|---|---|---|
| Ki | 4 | 4 | 4 | 4 |
| Si | 100 | 200 | 250 | 50 |
| Ti | 200 | 400 | 500 | 100 |
| Ui | 150 | 175 | 350 | 100 |
| Ni | 50 | 225 | 150 | 0 |
| Xi | 350 | 1075 | 950 | 100 |
| Mi | 0.2857 | 0.1860 | 0.2632 | 0.5000 |

In this case, because C2 has the lowest metric value (M2=0.1860), it is chosen as the "victim" from which the allocation module 258 will take the requested page and allocate it to C4. After this is done, C2's number of unused pages (U2) will decrease by one (since a page was taken away) and C4's number of used pages will increase by one (since it got C2's page).

Of course, it would be possible to calculate the metric $Mi=Xi/Si$ (inverted) rather than as $Mi=Si/Xi$: the invention would then select as the victim the client whose Mi value is greatest rather than smallest. The way in which the metric Mi is calculated will determine the appropriate criterion that the manager applies to determine from which clients to reclaim resource units.

Assume now that C4 continues to request pages and that the number of pages each of C, C2 and C3 is using does not change at all. C4 will continue to receive pages taken from C2, and for each page transferred. N2 will decrease by one and U4 will increase by one. When C4 has requested 79 additional pages, the situation would be as shown in Table 3.

TABLE 3

|    | C1     | C2     | C3     | C4     |
|----|--------|--------|--------|--------|
| Ki | 4      | 4      | 4      | 4      |
| Si | 100    | 200    | 250    | 50     |
| Ti | 200    | 321    | 500    | 179    |
| Ui | 150    | 175    | 350    | 179    |
| Ni | 50     | 146    | 150    | 0      |
| Xi | 350    | 759    | 950    | 100    |
| Mi | 0.2857 | 0.2635 | 0.2632 | 0.2793 |

If C4 requests yet another page, then this next page will be taken from C3, not C2, whose metric M2 will have increased every time the manager 250 allocated one of (C2's unused pages to C4.

Of course, in actual implementations, many different clients will often be requesting (or releasing) pages, in any order. The calculations and allocation scheme described for the simple example above will work just as well in such a complicated. "real-life" situation whenever a conflict arises in the demand for memory: The manager computes the metrics Mi and takes from the client whose metric is currently the lowest. After reallocation of the page, the number of unused pages of the "victim" client will have decreased, the number of used pages of the beneficiary client will have increased, and the metrics will have changed accordingly.

Note that the metric Mi of a client Ci can increase and/or be increased in either or both of two main ways: Either it uses relatively more of its allotment of pages, by actively using them or by having more of its unused pages taken away, or its number of shares is increased, for example, by buying or by otherwise acquiring more shares, for example by being given more shares by the administrator of the system. Note also that if all clients are operating at "full capacity." meaning that they actively are using their full allotments of memory pages, then they will be allocated the same percentage of total pages as the percentage of the total shares they respectively own. Resource allocation according to the invention is therefore a dynamic process: If a client has a lot of idle memory and loses some of it due to the tax, then this client will still later be able to get that memory reallocated to it if it starts using more of its existing, remaining allocation.

Note that in order to compute the metric "Mi", the manager 250 does not need to know which particular pages the various clients have accessed, but rather only what fraction of the allocated pages they have accessed. Any known method may then be used to select which page(s) is/are to be reclaimed once the manager has decided from which client to take it/them. One method is for the manager 250 to allow the victim client itself to choose which page(s) to relinquish, for example, the page(s) the client itself deems least valuable to itself. Alternatively, many conventional operating systems use page table entry (PTE) "access bit" information updated by the MMU hardware to approximate a"least recently used" policy, which the invention could use to choose which particular pages to revoke from a victim client. A victim client's pages could also be selected for reclamation and reallocation randomly. The allocation method according to the invention does not require any particular procedure for victim page selection.

Tax Schemes

Changing the cost factor Ki will affect the reallocation of pages: The higher the value of Ki is, the greater will be the decrease in the metric for every idle, that is, not actively used, page. In other words, the higher Ki is, the more idleness is "punished."

With the cost factor K=4, for example, an idle page costs the same as four actively used pages when it comes to determining which client is to be designated as the next "victim." This corresponds to a "tax rate" of 75%. As was mentioned above, in general, the tax rate (in percentage) will be $100*(1-1/K)$, where K is greater than or equal to unity. This means that a cost factor of K=1 implies no tax at all (0%), since unused pages will then have the same value as actively used pages. This is, of course, true given the preferred formulas described above; With K=1, $Mi/Xi=Mi/(Ni+Ui)$ will be constant and the same for each client.

As has just been mentioned, K is preferably at least unity: If $0<K<1$, then clients would be "rewarded" the more pages they leave idle. In effect, active, productive, "hard-working" clients would be forced to surrender more and more allocated resource units to idle clients, and the more idle a client is the higher priority it would have in receiving additional resource units from the manager. As in its economic "welfare state" analog, this will lead to inefficiency. Waste and sloth.

In the embodiment of the invention described above, all clients have the same "flat" tax rate, that is, $K1=K2= \ldots = Kn$. This is not necessary and reflects merely one possible policy choice. Some alternative schemes include:

"Marginal" or "graduated" tax—Ki is generalized to be a function f of the number of used and unused pages themselves, that is $Ki=f(Ui,Ni)$. For example, the function may be based on the fraction of idle pages, such as $Ki=f(Ni/(Ni+Ui))$, or based on the absolute number of idle pages, $Ki=f(Ni)$, or alternatively based on some other variable(s). One efficient way to implement this scheme would be to determine Ki using a lookup table of intervals for f, with different tax rates for each. If the marginal tax rate increases with the number of idle pages, then idleness will be punished with increasing severity: The Nth idle page will be penalized more than the (N−1)th idle page.

"Individualized" taxation—In this case, the tax parameter Ki for at least one client Ci is set individually. This would allow the system administrator to prioritize the needs of some clients deemed more important at the performance expense of other clients.

"Time-varying" taxation—K may be made a function of time as well as of the number of current unused pages: for each client. K may be increased the longer a page (or block of pages) currently allocated to that client remains idle.

"Tax the rich"—The rate K for a client with a relatively large number of shares is set larger than the rates for clients with relatively fewer shares; thus, Ki is determined by a function f, that is, $Ki=f(Si)$, which increases with increasing Si. This policy may be made marginal, with several values of K depending on the number of shares of each client. This policy would avoid many smaller clients suffering slower performance because of one or only a few large clients. Of course, such a tax policy would discourage clients from buying more shares.

"Tax the poor"—The opposite of the above: K is increased as the relative number of shares decreases; thus, Ki is determined by a function f, that is, Ki=f(Si), which increases with decreasing Si. This would prevent high-priority, large clients from suffering decreased performance because of many small clients.

Of course, combinations of the above schemes, or even other schemes, may be implemented in the invention. For example, Ki could be made a function of Si, Ui, and Ni, that is, Ki=f(Si,Ui,Ni). All that is necessary is that some tax parameter, function or schedule Ki should be associated with each client Ci that is subject to the allocation mechanism of this invention.

Activity—Definition and Measure

In order to calculate the metric Mi, the invention also needs to be able to determine how many allocated resource units are currently in use, or "active," as opposed to which are not in use or "idle." In other words, the operation of the activity sensor 254 must be specified. Any definition and measure of "idleness" may be used in the invention—the resource allocation procedure according to the invention is independent of how idleness is defined, sensed and measured.

When the resource is memory, one "brute force" method would be to use existing memory tracing mechanisms that use capabilities of the hardware MMU 112, together with a dedicated data structure in the system software, to detect accesses by each client to any page allocated to it. Any page not accessed in some way within a predetermined time would then be deemed to be idle; alternatively, all allocated pages could initially be considered to be idle, and are marked "active" only if they are accessed within a predetermined time, and their active status is maintained only if they am accessed within predetermined intervals thereafter. The disadvantage of this method of sensing activity is its wastefulness; As is well known, memory tracing carries a performance cost.

It is therefore preferable to reduce this cost by accepting less accuracy in the determination of Ui and Ni. This loss of accuracy will in almost all cases be well within acceptable limits. The trade-off between accuracy of memory allocation and speed can be determined in each implementation of the invention using known design methods.

In the preferred embodiment of the invention, client activity is determined by statistical sampling and by using "watch," "trace" and "measure" procedures. According to this embodiment of the invention, a random, preferably small subset of the total number of pages is chosen by the activity sensing module 254 for each client. The chosen subset comprises the pages to be "watched," that is, observed for activity. The pages in the randomly chosen subset are then "traced." using either existing mechanisms within the system hardware and software, or by being invalidated in the translation lookaside buffer (TLB) and MMU caches (which is roughly equivalent to the conventional memory tracing mechanism). The trace generates a conventional signal (sometimes referred to as a "hidden page fault") when the watched page is first accessed, after which the trace is typically removed. Alternatively, depending on the particular implementation of the invention, accesses to pages may be "traced" by clearing the access bit in PTEs corresponding to the "watched" pages at the start of the measurement interval. At the end of the interval, the access bits would be examined to see if they had been set by the hardware MMU.

In the "measurement" phase, after any predetermined real or virtual time interval, the activity sensing module 254 then counts the number of pages that have been accessed by each client. Each such count represents one statistical estimate of the usage state of the clients. Assume that x % of the watched pages of a particular client were accessed by that client during the predetermined time interval. The values Ui and Ni can then be assumed to be roughly x % and (100-x) %, respectively, of the total number of pages Ti allocated to that client.

Note that error due to statistical sampling is approximately proportional to 1/sqrt(M), where M is the number of samples. The tradeoff between accuracy and implementation efficiency can therefore be specified for each particular implementation. To reduce variability, several estimates may be smoothed using, for example, a simple arithmetic mean, a moving average (weighted or not), an exponential smoothing function, etc.

Another advantage of statistical sampling (especially where the managed resource is memory) as in the preferred embodiment of the invention is that it is difficult or nonproductive, or both, for a client to try to "trick" the manager 250 in order to avoid having its pages revoked due to idleness; Since the client cannot foresee or even detect which subset of its pages is currently being watched (sampled), the only way it could ensure that its pages are counted as active is to actively access all of them. The very act of accessing a large number of pages will, however, directly result in performance problems (for example, cache interference, TLB interference, etc.) for the client.

In implementations in which the clients are sharing access to one or more devices, including multiple CPUs, conventional mechanisms may be used to measure what fraction of allocated time slot are being used by each client. In many cases, the clients themselves will communicate or indicate whether they are currently using their allocated shares of the resource. For example, conventional techniques may be used by the manager 250 to sense whether a client is at any given time executing a HALT instruction, or is executing an idle loop. If each client is polled, for example, p times per time interval, and c of the times, the client is either halted or in an idle loop, then the manager 250 may assume that the client is currently idling (c/p)*100% of the time. The manager can therefore use the ratio c/p to calculate Ui and Ni for client Ci, since Ui=(1−c/p)*Ti and Ni=(c/p)*Ti, where Ti is the total number of resource units (which may, for example, be units of time such as microseconds, CPU cycles, etc.) currently allocated to client Ci.

The time interval over which a client is polled may be predetermined and fixed, or adjustable, or even random. Note that using a random time interval (having some mean and predetermined, preferably uniform distribution) for sampling has the advantage of avoiding undesirable correlation with other periodic activities.

Similar methods may be used to measure activity where the resource being managed is bandwidth of such I/O devices as the hard disk 140, the network connection device 150, or other devices 400. In these cases, the manager 250 may check for idleness by, for example, measuring what percentage of or how often the queue of pending I/O requests of the respective device is empty when allocated to each client.

Virtualized Embodiment of the Invention

Figure 2:
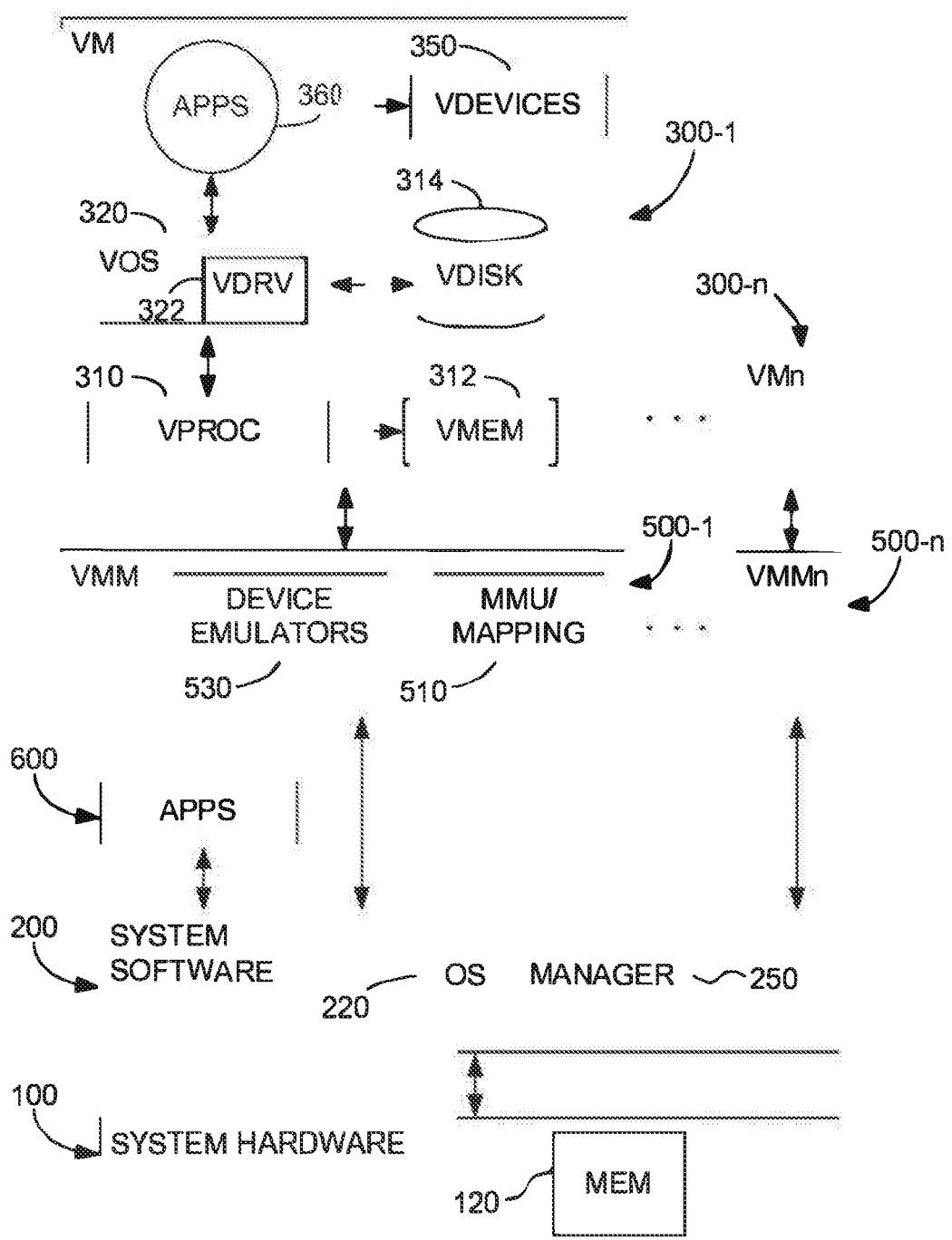
FIG. 2 is a block diagram that shows the main components of a preferred embodiment of a resource allocation system according to the invention, in which at least some of the clients are virtual machines.

In the preferred embodiment of the invention, each client 300-1, ... 300-n is a software component usually referred to in computer science as a "virtual machine" (VM), which is installed to run as a guest on the host system hardware and software. It is also possible for some clients to be VMs and other clients to be other, non-virtualized applications 600. This embodiment is illustrated in FIG. 2, in which structures that have already been described retain the same reference numbers.

Virtual Machines

As is well known in the art, a VM is a software abstraction—a "virtualization"—of an actual physical computer system. As such, each VM will typically include one or more virtual CPUs 310 (VPROC), a virtual operating system 320 (VOS) (which may, but need not, simply be a copy of a conventional, commodity OS), virtual system memory 312 (VMEM), a virtual disk 314 (VDISK), virtual peripheral devices 350 (VDEVICES) and drivers 322 (VDRV) for handling the virtual devices 350, all of which are implemented in software to emulate the corresponding components of an actual computer. Although the key components of only one VM are illustrated in FIG. 2 and discussed below, the structure of any other VMs will be essentially identical.

Of course, most computers are intended to run various applications, and VMs are usually no exception. Consequently, by way of example, FIG. 2 illustrates a group of applications 360 (which may be a single application) installed to run at user level on the VOS 320; any number of applications, including none at all, may be loaded for running on the VOS, limited only by the requirements of the VM. If the VM is properly designed, then the applications (or the user of the applications) will not "know" that they are not running directly on "real" hardware. Of course, all of the applications and the components of the VM are instructions and data stored in memory, just as any other software. The concept, design and operation of virtual machines are well known in the field of computer science.

Virtual Machine Monitors

Some interface is usually required between a VM and the underlying "real" OS 220 (real in the sense of being either the native OS of the underlying physical computer, or the OS or other system-level software that handles actual I/O operations, takes faults and interrupts, etc.) and hardware, which are responsible for actually executing VM-issued instructions and transferring data to and from the actual, physical memory and storage devices 120, 140. This interface is often referred to as a virtual machine monitor (VMM).

A VMM is usually a thin piece of software that runs directly on top of a host, such as the system software 200, or directly on the hardware, and virtualizes all, or at least some of, the resources of the machine. The interface exported to the respective VM is the same as the hardware interface, of the machine, or at least of some predefined hardware platform, so that the virtual OS need not be aware of the presence of the VMM. The VMM also usually tracks and either forwards (to the OS 220) or itself schedules and handles all requests by its VM for machine resources as well as various faults and interrupts. The general features of VMMs are known in the art and are therefore not discussed in detail here.

In FIG. 2, VMMs 500-1 ... 500-n, are shown, acting as interfaces for their respective attached VMs 300-1, ... , 300-1n. It would also be possible to include each VMM as part of its respective VM, that is, in each virtual system. Moreover, it would also be possible to use a single VMM to act as the interface to all VMs, although it will in many cases be more difficult to switch between the different contexts of the various VMs (for example, if different VMs use different virtual operating systems) than it is simply to include a separate VMM for each VM. The important point is simply that some well-defined, known interface should be provided between each VM and the underlying system hardware 100 and software 220.

In some conventional systems. VMMs run directly on the underlying system hardware 100, and will thus act as the "real" operating system for its associated VM. In other systems, the HOS 220 is interposed as a software layer between VMMs and the hardware. Still other arrangements are possible, all of which may be used in the invention as long as the manager 250 is included at the software level that is configured to control access to the resource that the invention is to allocate. Each VMM will typically include other software components such as device emulators 530 that emulate the characteristics of respective physical devices. Such components, and others such as an interrupt handler, etc., are common in VMMs, but a description of these components is not necessary to understanding this invention and is therefore not included here: these components are well known in the art of computer virtualization.

One advantage of virtualization is that each VM can be isolated from all others, and from all software other than the VMM, which itself will be transparent to the VM; indeed, the user of a VM will usually be completely unaware that it is not a "real" computer, n the context of this invention, another advantage is that each VM will operate completely within a virtual address space that is defined by the VMM. As a result, a change in mapping of physical addresses can be accomplished in a manner that is transparent to the VM, and that does not require modifications to the underlying guest operating system. The manager 250 in this virtualized embodiment of the invention is therefore preferably located within the system software, which resides at a level between the VMMs and the system hardware. The manager 250, and the operations it carries out, can thus remain completely transparent to the virtual operating systems within the VMs.

In the following description of the invention, merely for the sake of simplicity, only one VM/VMM pair is discussed. The discussion applies equally, however, to all such VM/VMM pairs that may be included in any given implementation of the invention.

Applications 360 (and any other virtual component that runs on the VOS) typically address virtual memory, just as in a "real" computer. The VOS 320 then maps these virtual page numbers (VPNs) to "physical" page numbers (PPNs), which the VM "believes" correspond to actual machine memory 120, but which in fact do not. An additional mapping must therefore take place in order to associate a given VPN with the actual machine memory page MPN. The VPN-to-PPN mapping takes place within the VM. The VMM includes a memory mapping module 510 that in turn maintains a PPN-to-MPN map, which may be designed as any other memory page map. When a VMM requests a page on behalf of its VM, the VMM therefore knows and can pass the PPN to the manager 250, which may then allocate a corresponding MPN just as in the non-virtualized embodiment of the invention. The manager 250 may then watch, trace and measure page usage by each VM, as well as dynamically redistribute pages based on the usage, in the same manner as described above.

One other advantage of the virtualized embodiment of the invention is its efficiency in implementing the sampling procedure described above for estimating the activity of the different client VMs. Note that the VMM will be able to track memory references by its VM completely transparently. This contrasts with a conventional OS, for which it is extremely difficult to track references to physical memory pages, despite the fact that many processor architectures, including the x86, maintain an "accessed" bit in each page table entry (PTE) for the purpose of tracking page references: The problem with the existing hardware approach is that it tracks references to virtual memory pages—a PTE maps a virtual page to a physical page (that is, a VPN to a PPN). Consequently, if a single physical page is shared across multiple address spaces, there is no easy way to determine if/when the physical page is accessed short of checking all of the page tables that may contain a PTE mapped to that physical page, or by maintaining an explicit reverse mapping from each PPN to all VPNs mapped to it (sometimes referred to as a "backmap").

The virtualized embodiment of the invention avoids this limitation because the VMM, unlike a conventional operating system, is able to observe and exploit the extra level of addressing indirection made possible through the virtualization: guest virtual pages (VPNs) map to guest "physical" pages (PPNs), which in turn map to hardware "machine" pages (MPNs). Because the VPN-to-PPN and PPN-to-MPN mappings are observable by the VMM, the VMM is easily able to identify accesses to guest "physical" pages, and therefore to enable statistical sampling of physical pages for the purpose of estimating client memory usage.

In the preferred embodiment of the invention, the mechanism used to track sampled pages is to invalidate each sampled page from all VMM cache data structures at the start of the sampling period, and to mark them as "sampled" in the internal VMM page map data structure, which will be included in the MMU/mapping module 510. The first reference from the VM to a sampled page will then force a lookup in this structure, and a lookup of a sampled page marks the page as "accessed". Other known page tracing mechanisms within the VMM may also be used.

Note that the sampling period used in the invention (both the non-virtualized and virtualized embodiments) is preferably a parameter that can be configured by a system administrator and may be measured in either real or virtual time. In one prototype of the invention, the sampling period was configurable, but had a default setting of 30 seconds of VM (virtual) time, which may correspond to more than 30 seconds of real time if there are more VMs than processors. It would also be possible to specify different sampling intervals for each client. For example, a longer sampling interval might be used for a client that has more pages. The optimal sampling period(s) for any given implementation of the invention may be determined using conventional experimental procedures.

Page Coloring

In some systems, a technique known as "page coloring" is used to reduce intra-client or inter-client cache interference. For example, the cache may be partitioned across clients in order to improve performance isolation, and one or more colors may be allocated to each client or group of clients.

Clients are then also grouped per color, with each group being restricted to sharing only the cache memory partition of the respective color(s). Coloring is often implemented by restricting the machine page numbers (or other mappable memory units) used by each client group to have the same least-significant bits (LSBs). For example, assume that the memory has four colors, "Red," "blue," "yellow," and "green" machine page numbers could consistently have "00", "01," "10" and "11" as the two LSBs. The invention may be used even in page-colored systems. In this case, the resource will be memory pages of a particular color or set of colors. The manager will then replicate the mechanisms described above for each color in order to make resource allocation decisions separately for clients in each respective color group.

Application-Level Resource Management

In the embodiments of the invention described above, the manager 250 is implemented in the system software 200. It is also possible, however, to use the invention to manage resources in non-OS, application-level contexts as well. For example, an application may sub-allocate its own resources (such as buffer space, etc.) to multiple clients. For instance, in order to remain essentially self-contained and isolated, a Java VM often manages its own resources when running multiple applets. The manager according to the invention could then be included within the resource-management component of the Java VM itself. All that is required to take advantage of the invention for resource allocation is that whichever system the invention is to be included in, at whatever level, should have some component that manages the resource and in which the manager 250 is installed.

System-Initiated Reallocation

In the embodiments of the invention described above, reallocation of memory pages for other resource units) is triggered by a request signal issued by a client for one or more additional pages. Other criteria and corresponding signals may be used, however, to trigger reallocation. For example, the manager 250 could automatically rebalance the allocation of pages by evaluating the metrics Mi and redistributing page allocations accordingly, even absent any request from a client.

During such a system-initiated rebalancing operation, the manager could, for example, assume that some predetermined number of pages is to be reallocated, just as if some client had requested this number of pages. One alternative would be for the manager to continue reallocating pages until all the metrics Mi are at least approximately equal, for example, until no clients allocation differ by more than some predetermined number of resource units from the optimal allocations based on the metrics Mi.

The manager could perform this automatic reallocation periodically, for example, according to a predetermined schedule, or as a background task during idle processing periods.

Free-Pool Client

As is mentioned above, if there is a "free" pool of unallocated memory pages (or other resource units) from which to draw, then the manager 250 allocates additional pages to clients (either on its own initiative, or at the request of a client) from this pool. This free pool may simply be pages that have not yet been allocated to any client. Free pages may also become available when some system activity (for example, an internal OS activity) releases memory, or when a client terminates or leaves the system.

Another way to handle free, that is, as yet unallocated, pages is to include a "dummy" or "free-pool" client Cf to which all free pages are allocated. As long as at least one page remains allocated to Cf, the metric Mf for Cf is then fixed at a value that ensures that Cf will be selected as the victim client. When the free pool is exhausted and no pages remain allocated to Cf, then Mf is fixed at a value that ensures that Cf will not be selected as the victim client. For example, assuming that the criterion for selection as a victim is that a particular client has a minimum metric value, then Mf could be set equal to zero as long as Cf has at least one page and a maximum possible metric value otherwise. Using this arrangement, the manager 250 is able to handle allocation of free-pool pages just as any other pages, following the procedures described above.

What is claimed is:

1. A method for allocating resource units of an allocatable resource among a plurality of clients, the method comprising:
   for each client, evaluating a metric that is a function of at least a usage-based factor, the usage-based factor being a function of a first measure of resource units allocated to the client that the client is actively using and a second measure of resource units allocated to the client that the client is not actively using; and
   reclaiming and reallocating a resource unit from one of the clients when the metric for that client meets a predetermined criterion.

2. The method of claim 1, further comprising penalizing one of the clients when the metric for that client meets the predetermined criterion.

3. The method of claim 2, further comprising:
   identifying a tax to apply against the second measure of resource units; and
   wherein penalizing one of the clients when the metric for that client meets the predetermined criterion comprises applying the tax to the one of the clients when the metric for that client meets the predetermined criterion.

4. The method of claim 3, wherein the tax is based on a total number of resource units allocated to the client.

5. The method of claim 3, wherein the tax is based on whether resource is time-shared resource or a space-shared resource.

6. The method of claim 3, wherein the tax is based on an amount of time the client does not actively use a resource.

7. The method of claim 3, wherein the tax increases as the second measure of resource units increases.

8. A system comprising:
   a client; and
   a processor programmed to:
      for each client, evaluate a metric that is a function of at least a usage-based factor, the usage-based factor being a function of a first measure of resource units allocated to the client that the client is actively using and a second measure of resource units allocated to the client that the client is not actively using; and
      reclaim and reallocating a resource unit from one of the clients when the metric for that client meets a predetermined criterion.

9. The system of claim 8, wherein the processor is further programmed to penalize one of the clients when the metric for that client meets the predetermined criterion.

10. The system of claim 9, wherein the processor is further programmed to:
    identify a tax to apply against the second measure of resource units; and
    wherein penalizing the client when the metric for that client meets the predetermined criterion comprises applying the tax to the client when the metric for that client meets the predetermined criterion.

11. The system of claim 10, wherein the tax is based on a total number of the set of resource units allocated to the client.

12. The system of claim 10, wherein the tax is based on whether the resource is time-shared resource or a space-shared resource.

13. The system of claim 10, wherein the tax is based on an amount of time the client does not actively use a resource.

14. The system of claim 10, wherein the tax increases as the second measure of resource units increases.

15. One or more non-transitory computer-readable media having computer executable instructions thereon, that when executed by one or more processors, cause the one or more processors to:
    for each client, evaluate a metric that is a function of at least a usage-based factor, the usage-based factor being a function of a first measure of resource units allocated to the client that the client is actively using and a second measure of resource units allocated to the client that the client is not actively using; and
    reclaim and reallocating a resource unit from one of the clients when the metric for that client meets a predetermined criterion.

16. The one or more non-transitory computer-readable media of claim 15, wherein the computer-executable instructions further cause the one or more processors to penalize one of the clients when the metric for that client meets the predetermined criterion.

17. The one or more non-transitory computer-readable media of claim 16, wherein the computer-executable instructions further cause the processor to:
    identify a tax to apply against the second measure of resource units; and
    wherein penalizing the client when the metric for that client meets the predetermined criterion comprises applying the tax to the client when the metric for that client meets the predetermined criterion.

18. The one or more non-transitory computer-readable media of claim 17, wherein the tax is based on a total number of resource units allocated to the client.

19. The one or more non-transitory computer-readable media of claim 17, wherein the tax is based on an amount of time the client does not actively use a resource unit.

20. The one or more non-transitory computer-readable media of claim 17, wherein the tax increases as the second measure of resource units increases.

* * * * *